No. 897,209.  
PATENTED AUG. 25, 1908.  
G. KNADLER.  
AUTOMOBILE OR VEHICLE TIRE  
APPLICATION FILED AUG. 20, 1906. RENEWED OCT. 16, 1907.
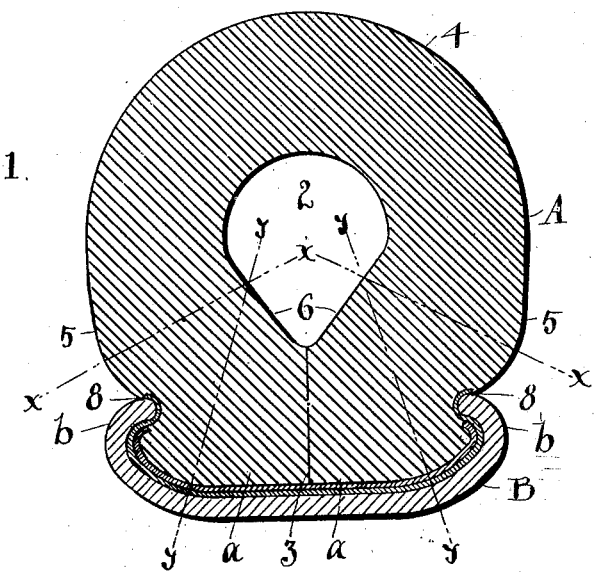
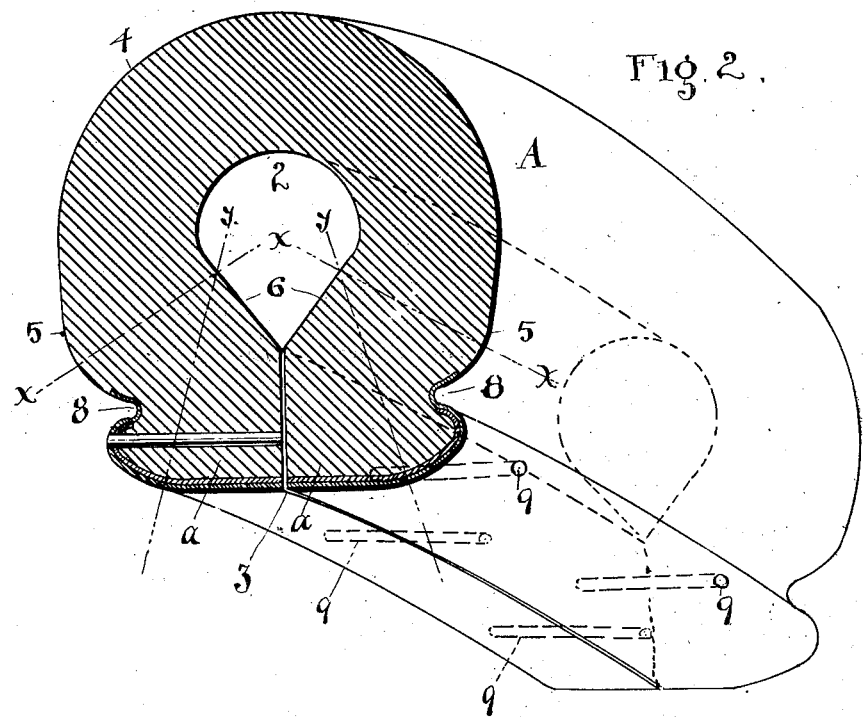
ATTEST  
C. A. Sell  
E. M. Fisher
INVENTOR  
Godfred Knadler  
By Fisher & Moser ATTYS

UNITED STATES PATENT OFFICE.

GODFRED KNADLER, OF CLEVELAND, OHIO.

AUTOMOBILE OR VEHICLE TIRE.

No. 897,209.　　　　Specification of Letters Patent.　　　　Patented Aug. 25, 1908.

Application filed August 20, 1906, Serial No. 331,242. Renewed October 16, 1907. Serial No. 397,677.

*To all whom it may concern:*

Be it known that I, GODFRED KNADLER, a citizen of the United States, residing at Cleveland, in the county of Cuyahoga and State of Ohio, have invented certain new and useful Improvements in Automobile or Vehicle Tires, and do declare that the following is a full, clear, and exact description of the invention, which will enable others skilled in the art to which it appertains to make and use the same.

My invention relates to automobile or vehicle tires, and the invention consists in an improvement upon the style of tire shown in Letters Patent issued to me Dec. 19, 1905, No. 807,748.

My improved tire embodies certain novel features of construction and proportion of parts which give the tire life and resiliency comparatively the same as in a pneumatic tire, but without the structural weakness of the pneumatic tire, in that my tire is almost incapable of being punctured. Even though my tire is punctured or cut under extreme conditions, it is so proportioned and constructed that the puncture or cut does not impair its efficiency or resiliency in any great degree. In short, a vehicle equipped with my improved tire will not be placed out of commission even though the tire may receive a puncture or cut; but can continue to run without noticeably lessening the cushioning effect of the tires, and without danger of rim cutting the tires.

In the drawings, Figure 1 is a cross section of one form of my improved tire, and Fig. 2 is a perspective view of a modification thereof as hereinafter fully described.

The present construction, as well as the one on which it is an improvement, is adapted to what are known as clencher rims, although it may be adapted to any other form of rim which gives the tire a proportionately wide and firm base and insures a durable engagement between tire and rim. Furthermore, as in the original patent, the present tire is endless and molded in one piece in such form as to bring the sides thereof together in the base when mounted upon the rim, and the said sides are so fashioned that when pressed together within the wheel rim they constitute essentially a solid base. Incident to this formation, I construct the tire —A— with a substantially central opening 2 extending around the same and constituting the air space or core of the tire, and the continuous split 3 where the sides of the tire meet in the base is of course hermetically sealed by crowding the said sides together. It will be seen also that the side walls facing each other at split 3 are of a depth greater even than the depth of rim B, so that the tire has all the advantage of a solid base for service, while it possesses all the advantages belonging to its manufacture by reason of its one piece character and adaptability to fold inward transversely, into a practically solid form, when fastened in the rim. Otherwise and as viewed in cross-section, the tire describes almost or exactly an exact semi-circle in its outer or peripheral half 4, but preferably its sides have a less curvature and are massive over and above the outer edges of rim B as seen at 5.

Now returning to the air space or core 2, it will be seen that this portion of the tire is especially designed to co-act with the slit in the base of the tire and with the other feature thereof already referred to and whereby exceptional strength and serviceability are obtained without the sacrifice of resiliency which has been found so indispensable in automobile and like tires. Thus, observe that the said air space or core 2 is exactly or practically heart or pear shape in its lower or inner portion as bounded by walls 6, while its upper or outer portion is curved transversely on a circle concentric with the outer circle 4 of the tire. This gives all points on the periphery or tread of the tire exactly the same relation to the core, while the outer and lower base portion of the sides of the tire is given a deeper embodiment of rubber and consequently corresponding increase of resistance and sustaining power than it could otherwise have and at the exact point where such support is needed. These lines are indicated between $x$, $x$, in the two figures, and run to the lower side portions of the core 2, which, converging in substantially straight lines as they do in the letter $v$, not only narrow the core at this point as compared with a ring shape, but distribute the lateral pressure into different lines from what would occur if the core were round in its base. Obviously, too, the greater depth of the solid portion of the tire is obtained over the base in or behind the V shaped walls 6, and hence the lines of weight distribute themselves mostly into the base of the tire as indicated by lines $y$, $y$, and the whole tire is held up toward its original form when under the load, rather than flattening out and riding excessively upon the rim.

The base proper for description is referred to as that portion within the engaging edges b of the rim and as indicated by a and the said inturned edges b engage in the grooves or channels 8 along both sides of the tire as usual in clencher construction. This or any equivalent construction may be employed.

Sometimes it occurs that especial precaution is wanted against possible disengagement from the rim by torsional or other excessive side strain, as may occur in turning a short corner under high speed and with heavy load, and hence in Fig. 2, I show a modification of base—a—in which short wires or rods 9 are arranged at intervals transversely of the base through the side beads of the tire and extend only through one side thereof to the middle alternately. Thus said wires or rods are staggered as to the two sides of the base and terminate alike at the split 3 from both sides. This contributes materially to the strength of the engagement of the base of the tire under the edges b of the rim by which it is confined and effectually anchors the tire, thereby making it impossible to throw the tire from the rim, even under the most severe side strain. Proportionately the space 2 is small as compared with the well known pneumatic tire, and also as compared with the solid rubber wall which incloses it. The advantages of this are twofold, first the deep solid wall gives me a punctureless tire, and secondly, it gives me practically the strength of a solid tire, but with the resiliency and absorbing quality of a pneumatic tire when it strikes an obstruction. Furthermore, the construction is such that it is easily manufactured and placed on the rim.

For purposes of comparison, it will be observed that the cross section of the open space is just equal to the thickness of the rubber about the same as may be seen in the drawings which represent a full size 3½ inch tire.

When successive pressure is brought to bear upon the tire, the slit in the base will open up at its upper end in that portion above the level of the top edges of the rim, thereby giving additional resilient qualities to the tire as a whole.

What I claim is:—

1. A non-inflatable cushion tire for vehicle wheels consisting of a single endless molded tubular body having separate base portions adapted to abut and form a solid sustaining wall on a central line through the base of the tire, and said body having its greatest thickness next above the immediate base on lines corresponding substantially to line x, x, as shown and described.

2. In wheels, the combination of a rim and a non-inflatable cushion tire having a molded tubular body semi-circular in cross section in its outer portion and having a centrally divided base having flat abutting walls extending above the edges of the wheel rim, and means for fastening the tire in the rim.

3. A non-inflatable endless cushion tire molded in one piece and having a centrally divided base with abutting faces and flaring walls above said faces and an outer wall rounded and projecting outwardly above the edges of the wheel rim to provide a deeper embodiment of rubber at this point than at any other outer portion of the tire above the wheel rim, in combination with a rim adapted to confine the tire and press said faces firmly together.

4. A clencher wheel rim, in combination with a non-inflatable cushion tire comprising a tubular molded rubber body having a semi-circular peripheral portion in cross section and divided base portions with side channels for the rim, said base portions having flat contacting faces centrally of the tire extending above the edges of the rim and being compressed together within the rim to provide a solid base, and locking wires embedded transversely through each of said base portions on a plane below the edges of the wheel rim.

In testimony whereof I sign this specification in the presence of two witnesses.

GODFRED KNADLER.

Witnesses:
R. B. MOSER,
C. A. SELL.